(12) United States Patent
Patwardhan et al.

(10) Patent No.: US 12,275,644 B2
(45) Date of Patent: Apr. 15, 2025

(54) LITHIUM CARBONATE PRODUCTION PROCESS AND APPARATUS

(71) Applicant: US Borax Inc., Wilmington, DE (US)

(72) Inventors: Amit Patwardhan, Wilmington, DE (US); Sandip Shinde, Wilmington, DE (US); Allen Wattenbarger, Wilmington, DE (US)

(73) Assignee: U.S. Borax Inc., Wilmington, DE (US)

( * ) Notice: Subject to any disclaimer, the term of this patent is extended or adjusted under 35 U.S.C. 154(b) by 662 days.

(21) Appl. No.: 17/539,825

(22) Filed: Dec. 1, 2021

(65) Prior Publication Data
US 2022/0169522 A1    Jun. 2, 2022

Related U.S. Application Data

(63) Continuation of application No. PCT/US2020/062844, filed on Dec. 2, 2020.

(51) Int. Cl.
| | |
|---|---|
| *C01D 15/08* | (2006.01) |
| *B01D 9/00* | (2006.01) |
| *C01D 7/24* | (2006.01) |
| *C01D 7/26* | (2006.01) |

(52) U.S. Cl.
CPC ........... *C01D 15/08* (2013.01); *B01D 9/0022* (2013.01); *B01D 9/004* (2013.01); *C01D 7/24* (2013.01); *C01D 7/26* (2013.01); *B01D 2009/0086* (2013.01); *C01P 2006/80* (2013.01)

(58) Field of Classification Search
CPC .................................................. C01D 15/08
See application file for complete search history.

(56) References Cited

U.S. PATENT DOCUMENTS

| | | | |
|---|---|---|---|
| 5,993,759 A | 11/1999 | Wilkomirsky | |
| 8,431,005 B1 | 4/2013 | Zbranek et al. | |
| 11,932,550 B2* | 3/2024 | Sharma ................. | C01D 15/02 |
| 2014/0334997 A1 | 11/2014 | Ehren et al. | |
| 2019/0048438 A1 | 2/2019 | Catovic | |
| 2020/0232105 A1 | 7/2020 | Snydacker et al. | |
| 2020/0263277 A1 | 8/2020 | Patwardhan et al. | |
| 2020/0385280 A1 | 12/2020 | Dai et al. | |
| 2023/0313338 A1* | 10/2023 | Grande Villarino ... | C01D 15/02 |
| | | | 423/179.5 |

OTHER PUBLICATIONS

Jul. 12, 2022—(WO) International Search Report and Written Opinion—App No. PCT/US2021/061415, 16 pages.
Feb. 26, 2021—(WO) International Search Report and Written Opinion—App PCTUS2020/62844.
Wood et al. "(355e) Characterization of Flash Crystallization Process Using PAT", AICHE Academy, AICHE (2010), p. 1-2.

* cited by examiner

*Primary Examiner* — Stuart L Hendrickson
(74) *Attorney, Agent, or Firm* — Boyle Fredrickson S.C.

(57) ABSTRACT

A method of forming lithium carbonate from a lithium-bearing solution including:
evaporating the lithium-bearing solution to precipitate a first group of impurities;
removing the first group of impurities to form a first purified solution; and
performing a flash crystallisation step within a predetermined temperature range to crystallise a second group of impurities from the first purified solution;
removing the second group of impurities from the first solution to form a second purified solution, wherein at least 90 wt % of lithium is recovered from the first purified solution; and
reacting the second purified solution with a metal carbonate to form lithium carbonate of at least 90 wt % purity.

19 Claims, 2 Drawing Sheets

LITHIUM CARBONATE PRODUCTION PROCESS AND APPARATUS

CROSS-REFERENCE TO RELATED APPLICATION

This application is a continuation of, and claims priority to, PCT/U52020/62844 entitled "A Lithium Carbonate Production Process and Apparatus," filed Dec. 2, 2021. Said application is incorporated herein fully by reference.

FIELD OF INVENTION

The invention relates to a process and an apparatus for producing lithium carbonate from a lithium-bearing solution.

In particular, the invention relates to a process and an apparatus for producing lithium carbonate from a lithium-bearing solution, wherein the solution is extracted from low grade lithium-bearing material such as waste material from borates mining or clay formations.

BACKGROUND

Lithium is used to make batteries for a variety of applications including electric cars, cameras and mobile phones.

Lithium is typically obtained by either extracting lithium-bearing salts from underground brine reservoirs or mining of lithium-containing rock/clay.

One example of lithium-bearing rock is in deposits in borates mines, with lithium being in waste rock and tailings generated from the borates mining and recovery process.

Low value gangue material typically ends up in a tailings dam or in a stacked heap. The tailings and stacked heaps have low concentrations of lithium that cannot be extracted economically at the present time. The lithium in the tailings and stacked heaps, whilst low grade, is a potential asset that may be unlocked economically later with current technology or with improving technology. The amounts of tailings and waste rock generated during mining can be significant and, hence, the potential lithium value can be equally significant.

Lithium is also present, typically in low concentrations, in clay formations and, to date, it has been challenging to extract lithium from these formations in an economically viable way.

The applicant has developed a method of extracting lithium from this low value gangue material which would be otherwise disposed of in a tailings dam.

The present invention seeks to improve the method developed by the applicant. Particularly, the present invention provides a method that enhances the purity of a lithium-bearing solution obtained from the low value gangue material.

The above description is not an admission of the common general knowledge in Australia or elsewhere.

SUMMARY OF INVENTION

The present invention provides a process of producing lithium carbonate from a lithium-bearing solution including a flash crystallisation step to purify the lithium-bearing solution.

The lithium-bearing solution may be obtained from lithium-bearing material such as sediment-hosted deposit.

The sediment-hosted deposit may be waste tailings obtained from an industrial processing plant such as a refinery or a borates mine. The sediment-hosted deposit may comprise clay minerals.

The lithium bearing clay minerals may be processed or treated clay for example clay minerals found in the waste material from a processing plant which may have been processed, for example, by leaching.

The lithium bearing clay minerals may be virgin clay such as untreated or natural clay, for example obtained from clay formations.

Examples of clay minerals include smectites such as hectorite and/or montmorillonite, Bigadic clays, and lithium bearing illite with or without lithium zeolites.

The lithium-bearing material may be material in which lithium is associated with high concentrations, typically 8-32 g of sodium, potassium and/or boron, per kg of lithium-bearing material. Suitably, the lithium-bearing material is a boron-containing ore.

The expression "low grade" refers to a lithium concentration ranging from 1-3 g/kg of lithium-bearing material.

The lithium-bearing solution may be a leachate extracted from the lithium-bearing material. Suitably, the lithium is in the form of lithium sulfate.

The lithium-bearing solution may be an aqueous leachate obtained from water leaching of roasted lithium-bearing material.

The lithium-bearing solution may have an initial concentration of at least 1,000 ppm. Suitably, the lithium-bearing solution has a concentration of at least 2,000 ppm.

The present invention also provides a method of forming lithium carbonate from a lithium-bearing solution including:

evaporating the lithium-bearing solution to precipitate a first group of impurities;

removing the first group of impurities to form a first purified solution; and performing a flash crystallisation step within a predetermined temperature range to crystallise a second group of impurities from the first purified solution;

removing the second group of impurities from the first purified solution to form a second purified solution, wherein at least 90 wt % of lithium is recovered from the first purified solution; and reacting the second purified solution with a metal carbonate to form lithium carbonate of at least 90 wt % purity.

The first group of impurities may be minerals comprising any one or more of calcite, thenardite, glaserite, glauberite, and anhydrite.

The first group of impurities may comprise calcium and/or sodium-containing salts.

The second group of impurities may be sodium, potassium and boron-containing impurities. Suitably, the sodium, potassium and boron impurities are in the form of mirabilite, glaserite and borax, respectively.

The method may include a filtering step to remove the first group of impurities formed during the evaporating step. This increases the concentration of the initial lithium-bearing solution and forms the first purified solution.

The evaporating step may form a first purified solution having a lithium concentration of at least 3,000 ppm. Suitably, the precipitating step forms a first purified solution having a lithium concentration of at least 4,000 ppm. More suitably, the precipitating step forms a first purified solution having a lithium concentration of at least 4,500 ppm. It was observed that double lithium salts, such as Na—Li sulfate salt ($Na_3Li(SO_4)_2 \cdot 6H_2O$), forms when the first purified solution cools to the crystallisation temperature. These double lithium salts form when the solution passes through the stability temperature range of the lithium-bearing salts.

The applicants realised that performing the crystallisation step outside the stability temperature of the lithium-bearing salts or reducing the time the solution spends in the stability temperature range of the lithium-bearing salts reduces formation of these salts.

The applicant performed extensive experiments to determine the optimal crystallisation temperature range that mitigates against the formation of these salts.

Further optimisation of the process parameters by the applicant led to the realisation that flash crystallisation reduces and can potentially avoid the formation of these salts.

Flash crystallisation is a process which enables the crystallisation temperature to be reached rapidly reducing the time spent within the stability temperature range of the lithium-bearing salts.

This reduces lithium losses during the crystallisation step.

The flash crystallisation step may recover at least 95 wt % of the lithium from the first purified solution. Suitably, the crystallisation step recovers at least 98 wt % of the lithium from the first purified solution. More suitably, the crystallisation step recovers at least 99 wt % of the lithium from the first purified solution.

The flash crystallizing step may be performed at a temperature ranging from 10-20° C., preferably from 13-17° C., more preferably from 15° C.

The method may include a filtering step to remove the second group of impurities formed during the crystallisation step.

The method may include a second crystallisation step to separate sodium and potassium-containing impurities from the first purified solution. This allows the commercially valuable potassium impurities to be removed and monetised, and recycle the lower value sodium impurities which may include sodium sulfate back into the system.

The flash crystallizing step may form a second purified solution having a lithium concentration of at least 5,000 ppm. Suitably, the crystallizing step may form a second purified solution having a lithium concentration of at least 6,000 ppm. Even more suitably, the crystallizing step forms a second purified solution having a lithium concentration of at least 10,000 ppm.

The reacting step may involve reacting the second purified solution with sodium carbonate to form lithium carbonate. Suitably, the sodium carbonate is in the form of soda ash. The reacting step may form lithium carbonate of at least 95 wt % purity.

The method may include a step of removing calcium carbonate from the second purified solution before the reacting step.

The method may include a recycling step which directs liquor from the reacting step to the crystallisation step. This increases the concentration of the lithium-bearing solution, including the first purified solution, for the crystallisation step.

A per-pass lithium recovery of 70-75% may be achieved by the reacting step.

The method may include refining the lithium carbonate to a purity of at least 95%. Suitably, the method includes a step of refining lithium carbonate to a purity of at least 99 wt %. The refining step may involve any one or a combination of ion exchange and nanofiltration.

The present invention also provides an apparatus to perform the above purification method.

In one embodiment, the apparatus comprises:
an evaporator to evaporate a lithium-bearing solution to precipitate a first group of impurities and form a first purified solution;

a crystalliser configured to perform a flash crystallisation step within a predetermined temperature range to crystallise a second group of impurities from the first purified solution and form a second purified solution, wherein at least 90 wt % of lithium is recovered from the first purified solution; and a reactor configured to react the second purified solution with a metal carbonate to form lithium carbonate of at least 90 wt % purity.

The evaporator may be connected to a storage tank holding the lithium-bearing solution.

The evaporator may be in fluid communication with an apparatus producing the lithium-bearing solution.

The evaporator may include a filter to remove the first group of impurities.

The crystalliser may be configured to receive recycled lithium-bearing liquor from the reactor.

The crystalliser may include a filter to remove the second group of impurities.

The crystalliser may include a temperature controller to control the crystallisation temperature.

The apparatus may include a second crystalliser to separate components of the second group of impurities. Suitably, the second crystalliser separates the sodium and potassium-containing components of the impurities. This would allow the sodium impurities to be recycled as feed material for the production of the lithium bearing solution and the potassium impurities to be sold.

The reactor may include an outlet that is in fluid communication with a crystalliser to direct lithium-bearing liquor to the crystalliser.

One advantage of the present invention is that it provides a lithium purification process that can effectively obtain high purity, of at least 90 wt %, lithium carbonate from low grade lithium-bearing waste material, for example waste rock and tailings, generated from a variety of industrial processes including, but not limited to, brine processing and borates mining. The applicant has also optimised the operating conditions of the purification process to maximise the yield of lithium.

Another advantage of the present invention is that it provides a lithium carbonate production process that reduces the operating cost of the process. The applicant developed a lithium carbonate production process including a crystallisation step that can remove impurities and water from the lithium-bearing solution. This simultaneously purifies and concentrates the lithium-bearing feed solution. This reduces energy requirements for concentrating the lithium-bearing solution.

BRIEF DESCRIPTION OF DRAWINGS

The invention is hereinafter described by way of example only with reference to the accompanying drawings, wherein.

DETAILED DESCRIPTION

The applicant has developed an apparatus for extracting lithium from a lithium-bearing material to produce a lithium-bearing solution.

The apparatus is located near or connected to a source of lithium-bearing material and is configured to receive this material. Examples of suitable lithium-bearing material sources include a tailings pond of a borates mine or clay formations.

During early process development studies, it was observed that a particular group of impurities could be crystallized from the lithium-bearing solution. The applicant realized that in addition to removing such impurities from the solution, the crystallization step also removes water, via the water of hydration, from the solution. This provided an efficient way of simultaneously purifying and concentrating the lithium-bearing solution.

However, one problem faced by the applicant was that an undesirable lithium-bearing salt, Na—Li sulfate ($Na_3Li(SO_4)_2 \cdot 6H_2O$), forms as the lithium-bearing solution cools to the crystallization temperature.

The applicant discovered that performing a flash crystallization step outside the stability range of this salt prevents its formation and reduces lithium loss. This was one of the motivations for developing the present invention.

Figure 1:
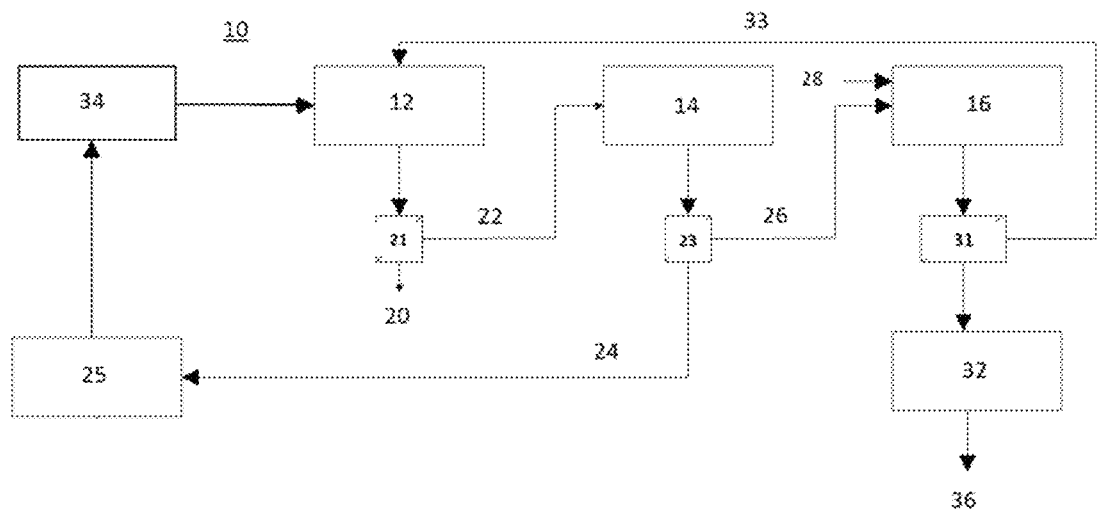
FIG. 1 is a process flow diagram according to one form of the invention.

The apparatus 10 as shown in FIG. 1 comprises primarily of an evaporator 12, a crystalliser 14 and a reactor 16.

The apparatus 10 is in fluid communication with a reactor that produces a lithium-bearing solution from waste tailings obtained from an industrial processing plant such as a refinery or a borates mine.

The waste tailings may comprise lithium bearing clay minerals.

The lithium bearing clay minerals may be processed or treated clay such as clay minerals found in the waste material from a processing plant which may have been processed, for example, by roasting.

Alternatively, the lithium bearing clay minerals may be virgin clay such as untreated or natural clay, for example obtained from clay formations that have not been subjected to thermal treatment.

Examples of clay minerals include smectites such as hectorite and/or montmorillonite, Bigadic clays, and lithium bearing illite with or without lithium zeolites.

The apparatus and method of producing the lithium-bearing solution from lithium-bearing material developed by the applicant is described in PCT patent application PCT/US2020/062855 filed on the same day as the present application by the same applicant, the disclosure of which is incorporated in its entirety.

The evaporator 12 is configured to evaporate the lithium-bearing solution to precipitate a first group of impurities 20 to form a first purified solution.

The first group of impurities can be minerals comprising any one of more of thenardite, glaserite, glauberite, and anhydrite, or salts such as calcium and sodium salts.

The evaporator 12 includes a filter 21 to remove the impurities formed during the evaporation process and is in fluid communication with the crystalliser 14 which receives the first purified solution 22 from the evaporator.

The crystallizer 14 may include a temperature controller to enable flash crystallisation at a preselected temperature to reduce the formation of lithium double salts such as Na—Li sulfate salt ($Na_3Li(SO_4)_2 \cdot 6H_2O$). Suitably, the temperature of the crystallisation step is maintained at about 15° C.

The crystallizer 14 includes a filter 23 to remove a second group of impurities 24 formed in the crystallizer to form a second purified solution 26. The second group of impurities may be sodium, potassium and boron impurities such as mirabilite, glaserite and borax, respectively.

The second group of impurities 24 may be sent to a dryer 25 to be dried before being recycled as part of the feed material to form the lithium-bearing solution.

The crystalliser 14 is in fluid communication with reactor 16, suitably a stirred tank reactor, which receives the second purified solution 26 from the crystalliser. The reactor 16 also includes a reagent inlet to receive metal carbonate 28, suitably sodium carbonate (soda ash), which reacts with the second purified solution 26 to form raw lithium carbonate. The formed lithium carbonate is directed to a centrifuge 31 to separate the lithium carbonate from the solution. The purified material is directed to a refinery 32 to be processed to further to increase its purity while the filtrate 33 is recycled back to evaporator 12. The refining process may involve an ion-exchange to form the final lithium carbonate product 36.

In one embodiment, a second crystalliser is positioned after the filter 23 to separate the sodium and potassium-containing impurities. The sodium impurities can be recycled as feed material for producing the lithium-bearing solution while the potassium impurities can be monetised.

In operation, a lithium-bearing solution 34 having a concentration of at least 2,000 ppm obtained from a reactor that processes waste tailings from an industrial processing plant is fed into the evaporator 12. The lithium-bearing solution is evaporated to concentrate the solution from 2,000 ppm to a concentration ranging from 3,500-5,000 ppm.

During the evaporation process, a first group of impurities comprising one or more of thenardite, glaserite, glauberite, and anhydrite is precipitated as the initial lithium-bearing solution is concentrated. These impurities are removed by filter 21 to form a first purified solution which is routed to crystalliser 14. A surge tank may be installed between the evaporator and the crystalliser to hold the first purified solution before it is sent to the crystalliser 14.

Figure 2:
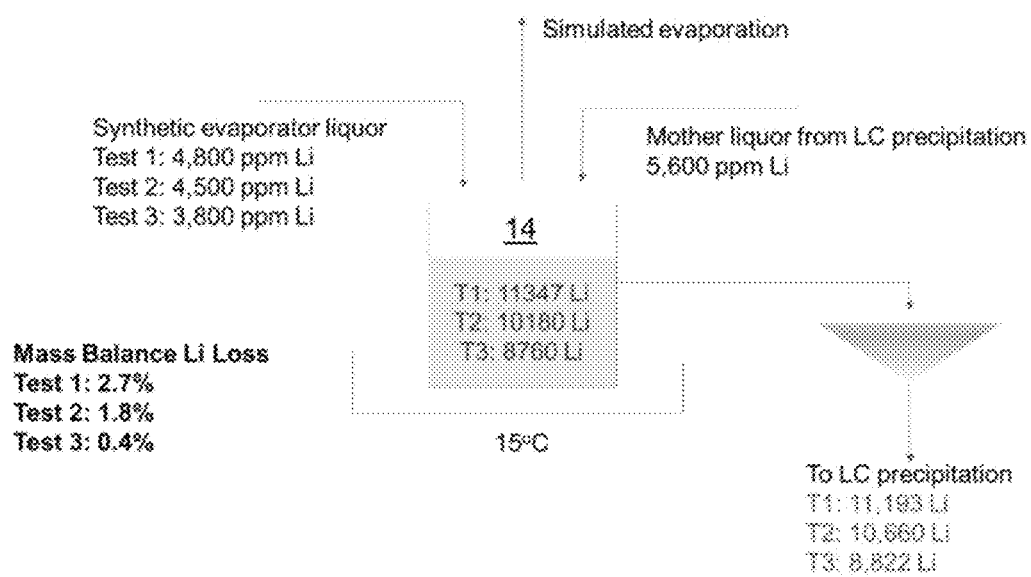
FIG. 2 is a flow diagram of the crystallisation stage according to another form of the invention.

In FIG. 2, three solutions with lithium concentrations of 3,800 ppm, 4,500 ppm and 4,800 ppm from the evaporator 12 are fed to the crystalliser 14 in separate runs (T1-T3).

Each solution is subjected to flash crystallisation at about 15° C. in crystalliser 14. This minimises the formation of lithium double salts which reduces lithium recovery.

During the crystallisation process, a second group of impurities such as mirabilite, glaserite and borax crystallise from solution and are removed to form a second purified solution. Removal of these crystals also concentrates the solution by removing water in the form of water of hydration.

The crystalliser 14 also receives mother liquor from the lithium carbonate precipitation step, which typically has a concentration of about 5,600 ppm.

The combined solutions in the evaporator 12 have concentrations of 9,400 ppm, 10,100 ppm and 10,400 ppm, respectively.

After removal of the crystalline impurities, the lithium concentration of these solutions rise to 11,347 ppm, 10,180 ppm and 8,760 ppm, respectively.

These output streams are filtered in filter 23, which is preferably a belt filter, to form a second purified lithium-bearing solution 26 having a concentration of 11,193 ppm, 10,660 ppm and 8,822 ppm, respectively. This solution is then directed to a reactor 16 where they are mixed with soda ash to form raw lithium carbonate. Impurities formed during the reaction such as calcium impurities are removed by filtration before the raw lithium carbonate is directed towards a refinery comprising a series of stirred tank reactors to raise the purity of the lithium carbonate to at least 90 wt %.

It was determined that the lithium loss from each run was less than 5 wt %. Specifically, the lithium loss in each run were 2.7 wt % (T1), 1.8 wt % (T2) and 0.4 wt % (T3), respectively (FIG. 1).

The lithium carbonate can be further processed to increase its purity to at least 95 wt %, suitably 99 wt %.

In one example, the lithium carbonate is reacted with a bicarbonate-containing material and fed into a series of ion exchangers. Nanofiltration can also be used to treat the lithium carbonate. The product is then sent to a precipitation tank and a thickener to isolate the purified lithium carbonate having a purity of at least 99 wt %. The purified lithium carbonate is then centrifuged and dried to form the final product.

Figure 3:
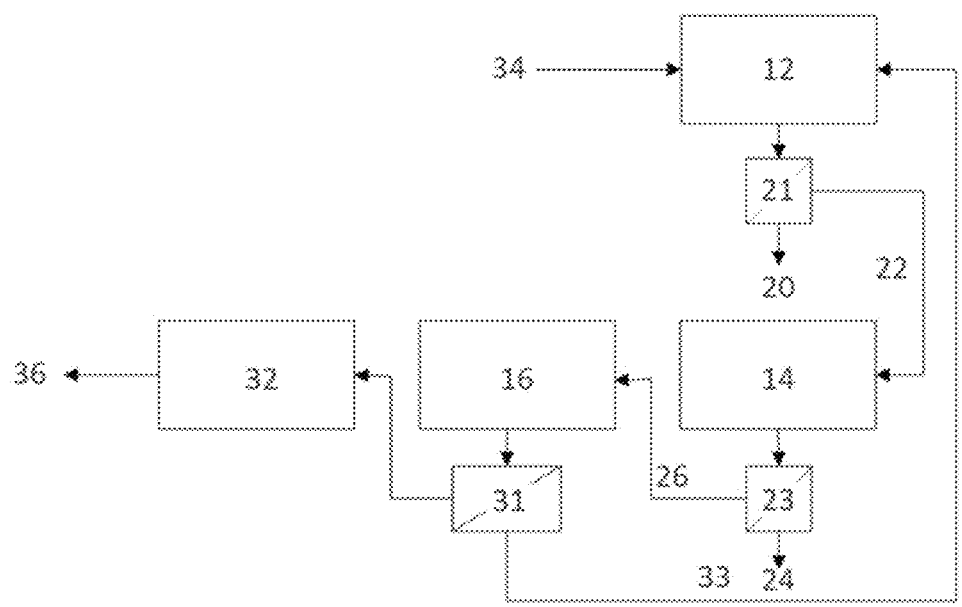
FIG. 3 is a process flow diagram according to another form of the invention.

FIG. 3 provides a second process flow diagram

The invention claimed is:

1. A method of forming lithium carbonate from a lithium-bearing solution including:
   evaporating the lithium-bearing solution to precipitate a first group of impurities;
   removing the first group of impurities to form a first purified solution; and
   performing a flash crystallisation step within a predetermined temperature range to crystallise a second group of impurities from the first purified solution;
   removing the second group of impurities from the first solution to form a second purified solution, wherein at least 90 wt % of lithium is recovered from the first purified solution; and
   reacting the second purified solution with a metal carbonate to form lithium carbonate of at least 90 wt % purity.

2. The method of claim 1, wherein the first group of impurities comprise calcium and/or sodium-containing salts.

3. The method of any one of the preceding claims, wherein the second group of impurities comprise sodium, potassium and boron-containing impurities.

4. The method of any one of the preceding claims, including a filtering step to remove the first group of impurities formed during the evaporating step.

5. The method of any one of the preceding claims, wherein the evaporating step forms a first purified solution having a lithium concentration of at least 3,000 ppm.

6. The method of any one of the preceding claims, wherein flash crystallisation step recovers at least 95 wt % of the lithium from the first purified solution.

7. The method of any one of the preceding claims, wherein the flash crystallizing step is performed at a temperature ranging from 10-20° C.

8. The method of any one of the preceding claims, including a filtering step to remove the second group of impurities formed during the crystallisation step.

9. The method of any one of the preceding claims, including a second crystallisation step to separate sodium and potassium-containing impurities from the first purified solution.

10. The method of claim 1, wherein the flash crystallizing step forms a second purified solution having a lithium concentration of at least 5,000 ppm.

11. The method of claim 1, wherein the reacting step involves reacting the second purified solution with sodium carbonate to form lithium carbonate.

12. The method of claim 1, wherein the reacting step forms lithium carbonate of at least 95 wt % purity.

13. The method of claim 1, including a step of removing calcium carbonate from the second purified solution before the reacting step.

14. The method of claim 1, including a recycling step which directs liquor from the reacting step to the crystallisation step.

15. The method of claim 1, including a step of refining the lithium carbonate to a purity of at least 95 wt %.

16. An apparatus comprises:
   an evaporator to evaporate a lithium-bearing solution to precipitate a first group of impurities and form a first purified solution;
   a crystalliser configured to perform a flash crystallisation step within a predetermined temperature range to crystallise a second group of impurities from the first purified solution and forms a second purified solution, wherein at least 90 wt % of lithium is recovered from the first purified solution;
   a reactor configured to react the second purified solution with a metal carbonate to form lithium carbonate of at least 90 wt % purity; and
   the crystalliser is configured to receive recycled lithium-bearing liquor recycled from the reactor.

17. The apparatus according to claim 16, wherein the evaporator includes a filter to remove the first group of impurities.

18. The apparatus according to claim 16, wherein the crystalliser includes a filter to remove the second group of impurities.

19. The apparatus according to claim 16, including a second crystalliser to separate components of the second group of impurities.

* * * * *